US010053093B2

(12) United States Patent
Thomas

(10) Patent No.: US 10,053,093 B2
(45) Date of Patent: Aug. 21, 2018

(54) METHOD AND SYSTEM FOR CONTROLLING A CRUISE CONTROL SYSTEM

(71) Applicant: Bendix Commercial Vehicle Systems LLC, Elyria, OH (US)

(72) Inventor: Thomas J Thomas, Brunswick, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 200 days.

(21) Appl. No.: 14/950,602

(22) Filed: Nov. 24, 2015

(65) Prior Publication Data

US 2017/0144659 A1    May 25, 2017

(51) Int. Cl.
    *B60W 30/14*    (2006.01)
    *G08G 1/01*    (2006.01)
    (Continued)

(52) U.S. Cl.
    CPC ........... *B60W 30/14* (2013.01); *G08G 1/0129* (2013.01); *B60W 2420/403* (2013.01);
    (Continued)

(58) Field of Classification Search
    CPC .. B60W 30/14; B60W 30/143; B60W 30/146; B60W 30/16; B60W 30/162;
    (Continued)

(56) References Cited

U.S. PATENT DOCUMENTS 6,042,505 A * 3/2000 Bellinger .............. B60W 10/06
    477/111
6,161,072 A * 12/2000 Clapper ............. B60K 31/0058
    180/170

(Continued)

FOREIGN PATENT DOCUMENTS

| CN | 103606246 A | 2/2014 |
| JP | 2008087635 A | 4/2008 |
| WO | 2006015425 A1 | 2/2006 |

OTHER PUBLICATIONS

BMW ConnectedDrive from A to Z, Search for Everything and Find it, http://www.bmw.com/com/en/insights/technology/connecteddrive/2013/a_to_z/index.html printed Jan. 9, 2017.

(Continued)

*Primary Examiner* — Thomas G Black
*Assistant Examiner* — Sara J Lewandroski
(74) *Attorney, Agent, or Firm* — Brian E. Kondas; Cheryl L. Greenly; Eugene E. Clair

(57) ABSTRACT

A method for controlling a cruise control system on a vehicle includes identifying a vehicle location and identifying a number of respective cruise control overrides by a driver at the vehicle location. If the number of cruise control overrides by the driver is at least a threshold number of overrides, identifying respective actions by the driver after the cruise control overrides, and creating a profile of the driver behavior associated with the vehicle location based on the respective actions by the driver within a range around the vehicle location after the driver overrode the cruise control.

22 Claims, 2 Drawing Sheets

(51) Int. Cl.
*G07C 5/10* (2006.01)
*G07C 5/04* (2006.01)

(52) U.S. Cl.
CPC ..... *B60W 2520/26* (2013.01); *B60W 2530/14* (2013.01); *B60W 2540/04* (2013.01); *B60W 2540/10* (2013.01); *B60W 2540/12* (2013.01); *B60W 2540/30* (2013.01); *B60W 2550/14* (2013.01); *B60W 2550/142* (2013.01); *B60W 2550/306* (2013.01); *B60W 2550/308* (2013.01); *G07C 5/04* (2013.01); *G07C 5/10* (2013.01)

(58) Field of Classification Search
CPC ....... B60W 30/165; B60W 30/17; G07C 5/00; G07C 5/008; G07C 5/02; G07C 5/04; G07C 5/06; G07C 5/08; G07C 5/0841; G07C 5/10; G08G 1/00; G08G 1/01; G08G 1/0104; G08G 1/0112; G08G 1/012; G08G 1/0125; G08G 1/0129; G08G 1/048; G08G 1/052; G08G 1/09623; G08G 1/09626; G08G 1/20; G08G 1/207; G08G 1/22
See application file for complete search history.

(56) References Cited

U.S. PATENT DOCUMENTS

| | | | |
|---|---|---|---|
| 8,116,971 B2 | 2/2012 | Chen et al. | |
| 8,417,448 B1 | 4/2013 | Denise | |
| 8,554,468 B1 | 10/2013 | Bullock | |
| 8,930,057 B2 | 1/2015 | Otake | |
| 8,965,621 B1* | 2/2015 | Urmson | G05D 1/0055 701/23 |
| 9,355,562 B1* | 5/2016 | Ferguson | G08G 1/167 |
| 9,361,797 B1* | 6/2016 | Chen | G08G 1/0112 |
| 9,656,606 B1* | 5/2017 | Vose | B60Q 9/008 |
| 9,849,887 B2* | 12/2017 | Heath | B60W 50/0097 |
| 2010/0087984 A1* | 4/2010 | Joseph | G09B 9/052 701/31.4 |
| 2010/0131148 A1 | 5/2010 | Camhi et al. | |
| 2010/0253526 A1 | 10/2010 | Szczerba et al. | |
| 2013/0096731 A1* | 4/2013 | Tamari | G06F 11/3013 701/1 |
| 2013/0246421 A1* | 9/2013 | Yamada | B60W 30/143 707/736 |
| 2013/0274958 A1 | 10/2013 | Uno | |
| 2013/0289846 A1* | 10/2013 | Mitchell | G06F 17/00 701/99 |
| 2013/0325202 A1 | 12/2013 | Howard et al. | |
| 2014/0058761 A1* | 2/2014 | Freiberger | G06Q 40/08 705/4 |
| 2014/0195106 A1* | 7/2014 | McQuade | G07C 5/0841 701/33.9 |
| 2014/0292539 A1* | 10/2014 | Omiya | G08G 1/0112 340/905 |
| 2014/0371981 A1 | 12/2014 | Nordbruch et al. | |
| 2015/0308837 A1* | 10/2015 | Cudak | G05D 1/0278 701/23 |
| 2016/0071418 A1* | 3/2016 | Oshida | G08G 1/22 701/23 |
| 2016/0086285 A1* | 3/2016 | Jordan Peters | G06Q 40/08 705/4 |
| 2016/0093210 A1* | 3/2016 | Bonhomme | G08G 1/0967 340/905 |
| 2016/0117921 A1* | 4/2016 | D'Amato | G08G 1/0112 701/117 |
| 2016/0169684 A1* | 6/2016 | Jamshidi Nekou | G01C 21/26 701/408 |
| 2016/0189544 A1* | 6/2016 | Ricci | G07C 5/008 701/117 |
| 2016/0293000 A1* | 10/2016 | Torgerson | G08G 1/0112 |
| 2016/0334236 A1* | 11/2016 | Mason | G01C 21/3492 |
| 2016/0357262 A1* | 12/2016 | Ansari | G06F 3/017 |
| 2017/0011562 A1* | 1/2017 | Hodges | G07C 5/008 |
| 2017/0043717 A1* | 2/2017 | Heiman | G08G 1/0175 |
| 2017/0057518 A1* | 3/2017 | Finegold | B60W 40/09 |
| 2017/0123434 A1* | 5/2017 | Urano | B60Q 9/008 |
| 2017/0132951 A1* | 5/2017 | Fields | G09B 19/167 |
| 2017/0356750 A1* | 12/2017 | Iagnemma | G01C 21/3461 |

OTHER PUBLICATIONS

Jean-Philippe Lauenburger, Michel Basset, Frank Coffin, Gerard Gissinger. Driver-aid system using path-planning for lateral vehicle control. Control Engineering Practice, Elsevier, 2003, 11, pp. 217-231. <10.1016/S0967-0661(02)00047-3>. <hal-00933588>.

* cited by examiner

METHOD AND SYSTEM FOR CONTROLLING A CRUISE CONTROL SYSTEM

BACKGROUND

The present invention relates to an adaptive cruise control system on a vehicle. It finds particular application in conjunction with encouraging the continued use of a vehicle's adaptive cruise control (ACC) system in non-typical driving conditions and road terrain and will be described with particular reference thereto. It will be appreciated, however, that the invention is also amenable to other applications.

Conventional ACC systems are designed for typical driving conditions and road terrain and attempt to balance maintaining the requisite gap (e.g., about 3 seconds) to a forward vehicle, maximizing fuel economy, safety, and driver sentiment. Non-typical driving conditions or road terrain present challenges for conventional ACC systems. Such non-typical driving conditions or road terrain include slight, moderate, and steep grades; unusual curves; non-typical off-ramps or on-ramps, and any other non-typical road terrain. It is not unusual for drivers in non-typical driving conditions or road terrain to override (e.g., disengage, turn-off, and/or change such as modify the speed of the vehicle to pass another vehicle) the vehicle ACC and manually drive the vehicle without the benefit of ACC system.

The present invention provides a new and improved apparatus and method which addresses the above-referenced problems.

SUMMARY

In one embodiment, a method for controlling a cruise control system on a vehicle includes identifying a vehicle location and identifying a number of respective cruise control overrides by a driver at the vehicle location. If the number of cruise control overrides by the driver is at least a threshold number of overrides, identifying respective actions by the driver after the cruise control overrides, and creating a profile of the driver behavior associated with the vehicle location based on the respective actions by the driver within a range around the vehicle location after the driver overrode the cruise control.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
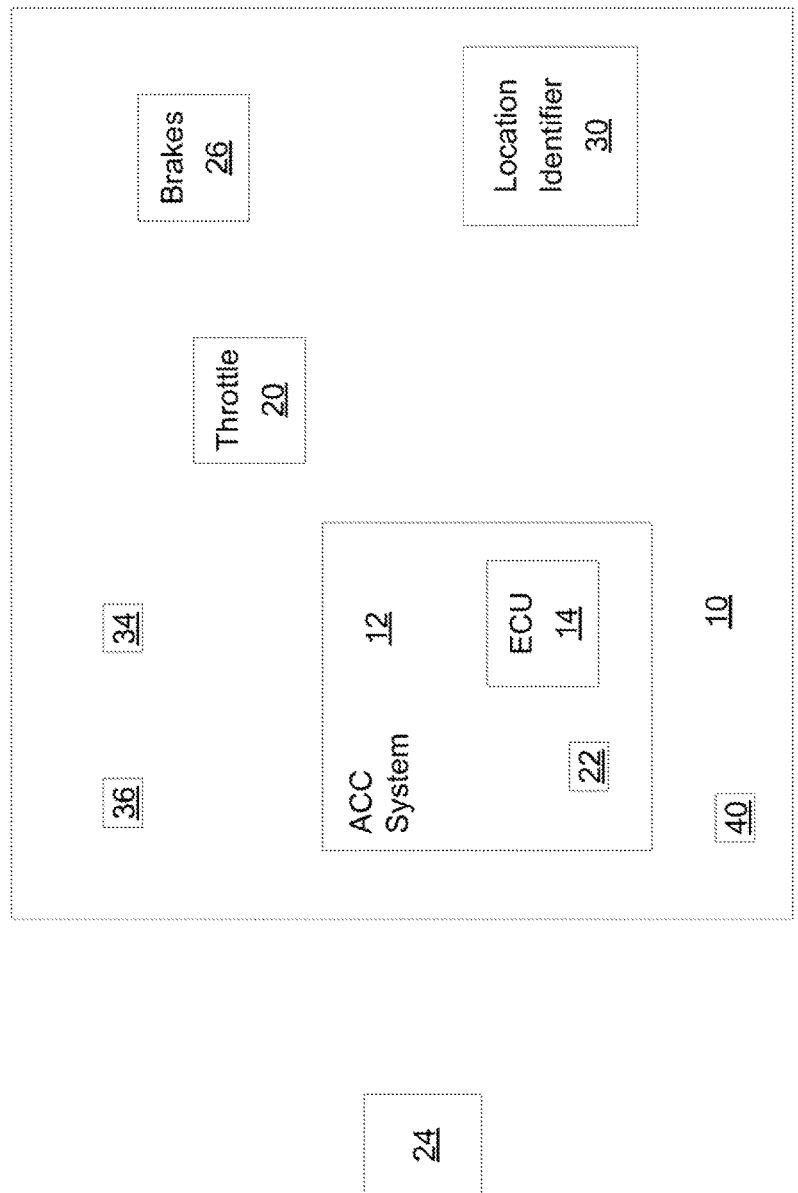
FIG. 1 illustrates a schematic representation of a vehicle in accordance with one embodiment of an apparatus illustrating principles of the present invention.

With reference to FIG. 1, a vehicle 10 includes a cruise control system 12 for controlling a speed of the vehicle 10. The cruise control system 12 includes an electronic control unit (ECU) 14, which controls a vehicle throttle 20 for maintaining a speed of the vehicle 10 that is set by an operator.

In one embodiment, the cruise control system 12 is an adaptive cruise control (ACC) system, which, in addition to controlling the vehicle throttle 20 for maintaining the speed of the vehicle 10, also includes a detection system 22 for detecting at least one object 24 in front of the vehicle 10. In one embodiment, the object 24 in front of the vehicle 10 is another vehicle that is referred to as a forward vehicle. In other embodiments, it is also contemplated that the cruise control system 12 is a conventional cruise control system.

The ECU 14 of the ACC system 12 processes data signals received from the detection system 22 for determining at least one of the presence of a forward vehicle 24, a current distance to the forward vehicle 24, and a current speed of the forward vehicle 24. In this embodiment, the ECU 14 controls the vehicle throttle 20 for maintaining the speed of the vehicle 10 based on at least one of the presence of the forward vehicle 24, the current distance to the forward vehicle 24, and the current speed of the forward vehicle 24. For example, the ECU 14 controls the vehicle throttle 20 to slow the speed of the vehicle 10 if the forward vehicle 24 is present and if the current distance to the forward vehicle 24 is less than a predetermined forward vehicle distance and/or the current speed of the forward vehicle 24 is less than a predetermined forward vehicle speed. In addition, the ECU 14 may control the vehicle throttle 20 to increase the speed of the vehicle 10 (e.g., if the current speed of the vehicle 10 is below the set speed) if no forward vehicle 24 is present, or if the forward vehicle 24 is present and if the current distance to the forward vehicle 24 is greater than the predetermined forward vehicle distance and/or the current speed of the forward vehicle 24 is greater than the predetermined forward vehicle speed. In one embodiment, the predetermined forward vehicle speed is determined dynamically based on the current distance to the forward vehicle 24. The ECU 14 of the ACC system 12 may also control brakes 26 on the vehicle 10 for controlling the speed of the vehicle 10.

A vehicle location identifier 30 is also included on the vehicle 10 and electrically communicates with the ECU 14. The vehicle location identifier 30 determines a current geographic location of the vehicle 10 and transmits signals to the ECU 14 identifying the current geographic location. In one embodiment, the vehicle location identifier 30 is a global positioning system (GPS).

A road terrain memory 34 also electrically communicates with the ECU 14. In one embodiment, the road terrain memory 34 is a look-up table prepopulated with data representing respective road terrains based on geographic locations. Different road terrains may include a road grade (e.g., 0% for a flat road, a negative percentage for a downhill slope, and a positive percentage for an uphill slope) and a road curve (e.g., 0% for a straight road, a negative percentage for a left curve, and a positive percentage for a right curve). It is contemplated that the ECU 14 identifies a deviation of 1% from a flat road (e.g., a −1% road grade or a 1% road grade) as a non-flat road and a deviation of 1% from a straight road (e.g., a −1% curve or a 1% curve) as a non-straight road. For example, the ECU 14 may query the road terrain memory 34 after receiving the current geographic location of the vehicle 10 and receive signals from the road terrain memory 34 indicating the road terrain at the current geographic location.

A current condition identifier 36 also electrically communicates with the ECU 14. In one embodiment, the current condition identifier 36 identifies a road condition at the current geographic location of the vehicle 10. For example, the current condition identifier 36 may identify one of dry, wet, and icy as a current road condition (e.g., driving condition). In addition, the current condition identifier 36 may identify one of clear and snow covered as a current road condition (e.g., driving condition). It is contemplated that the dry, wet, or icy current road condition (e.g., driving condition) may be identified by applying braking pressures to different wheels on the vehicle 10 to identify if respective wheel slips occur. Furthermore, the clear and snow covered current road condition (e.g., driving condition) may be identified via cameras on the vehicle 10.

In one embodiment, the ECU 14 identifies a current driver operating the vehicle 10. It is contemplated that the current driver is identified via an image taken by a camera, a fob carried by the driver that wirelessly communicates with the ECU 14, an identifier code manually entered by the current driver, etc. The ECU 14 also identifies when the current driver and/or other (e.g., previous) drivers override the cruise control system 12 (e.g., the ACC system) (e.g., disengage and/or change the cruise control system 12 to modify the speed of the vehicle) by, for example, manually switch off the cruise control system 12 or applying the brakes to slow the vehicle, or applying the throttle to increase the speed of the vehicle passing another vehicle. In addition, the ECU 14 identifies the current geographic location via the vehicle location identifier 30, the road terrain at the current geographic location via the road terrain memory 34, and the road condition at the current geographic location via the current condition identifier 36. Once the cruise control system 12 (e.g., the ACC system) is overridden by, for example, the driver and/or other drivers, the ECU 14 identifies respective actions by the driver and/or the other drivers. For example, the ECU 14 identifies at least one of a throttle position set by the driver and/or the other drivers, a gear position set by the driver and/or the other drivers, and a brake demanded by the driver and/or the other drivers. In addition, the ECU 14 identifies whether the forward vehicle 24 is present and, if so, the current distance to the forward vehicle 24.

A driver memory 40 (e.g., a central cruise control database), which electrically communicates with the ECU 14, receives data from the ECU 14 identifying the cruise control system 12 (e.g., the ACC system) override, the current geographic location, the road terrain at the current geographic location, the current road condition, the respective actions by the driver and/or the other drivers, whether the forward vehicle 24 is present and, if so, the current distance to the forward vehicle 24. The driver memory 40 acts as a historical database of the cruise control system 12 (e.g., the ACC system) overrides by the driver and/or other drivers (e.g., previous drivers).

Although the driver memory 40 is illustrated as indirectly electrically connected to the vehicle location identifier 30, the road terrain memory 34, and the current condition identifier 36 via the ECU 14, it is to be understood that other embodiments in which the driver memory 40 is directly electrically and/or wirelessly connected to at least one of the vehicle location identifier 30, the road terrain memory 34, and the current condition identifier 36 are also contemplated.

The ECU 14 acts as a means for determining whether to set the profile of the driver behavior associated with the vehicle location and the any additional previous vehicle locations as a default cruise control profile for the driver behavior at the vehicle location and the any additional previous vehicle locations. The ECU 14 also acts as a means for setting the profile of the driver behavior associated with at least one of the vehicle location and the any additional previous vehicle locations, based on the determination, as the default cruise control profile for the driver behavior at the vehicle location and the any additional previous vehicle locations.

Figure 2:
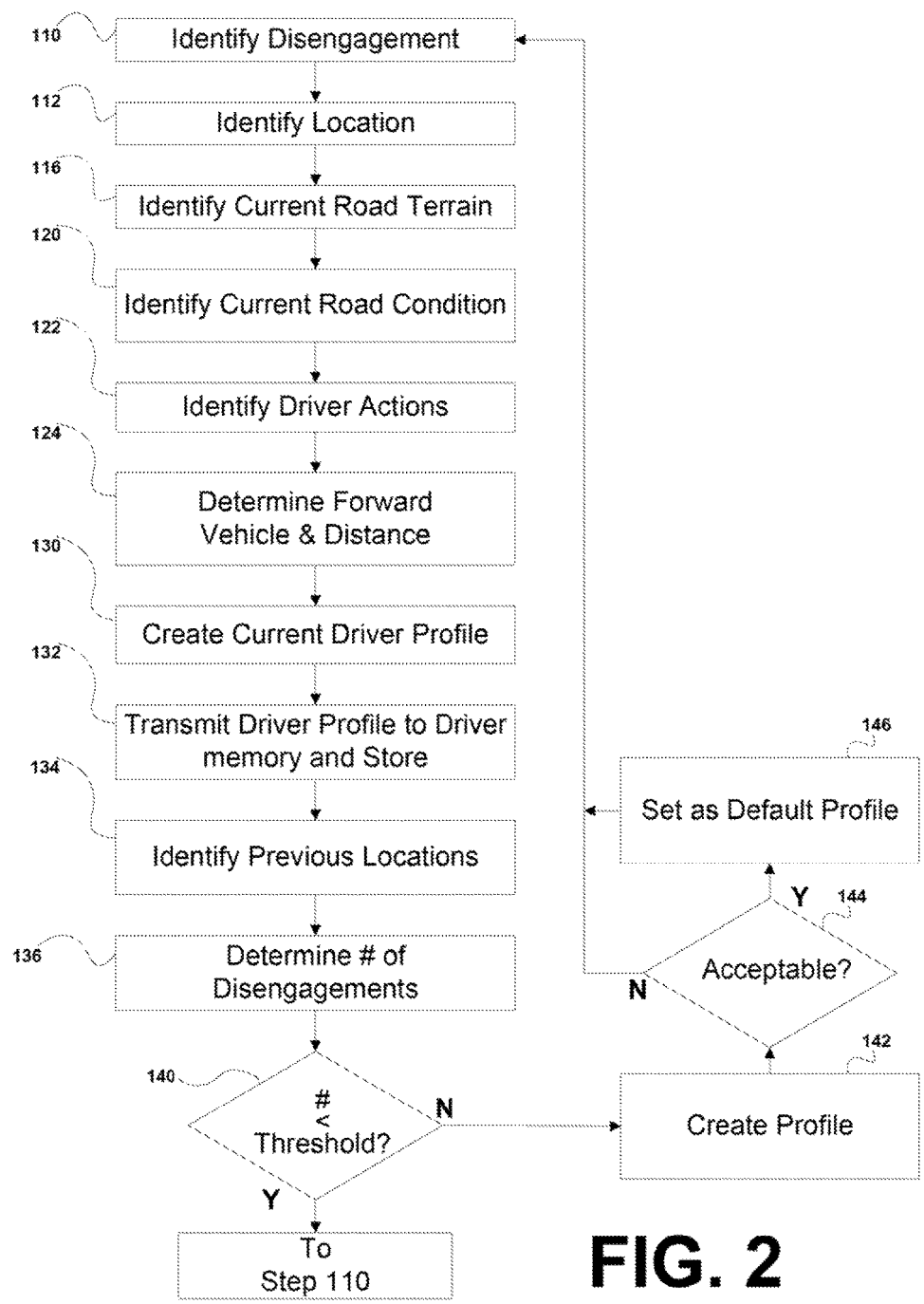
FIG. 2 is an exemplary methodology of controlling a cruise control system in accordance with one embodiment illustrating principles of the present invention.

With reference to FIG. 2, an exemplary methodology of the system shown in FIG. 1 for controlling a cruise control system of a vehicle is illustrated. As illustrated, the blocks represent functions, actions and/or events performed therein. It will be appreciated that electronic and software systems involve dynamic and flexible processes such that the illustrated blocks and described sequences can be performed in different sequences. It will also be appreciated by one of ordinary skill in the art that elements embodied as software may be implemented using various programming approaches such as machine language, procedural, object-oriented or artificial intelligence techniques. It will further be appreciated that, if desired and appropriate, some or all of the software can be embodied as part of a device's operating system. The ECU 14 is adapted to perform the steps described below.

With reference to FIGS. 1 and 2, in a step 110, a cruise control override is identified by the ECU 14. In a step 112, the current geographic location of the vehicle 10 where the cruise control override occurred is identified via the vehicle location identifier 30 and transmitted to the ICU 14. In a step 116, the ECU 14 identifies the road terrain of the current geographic location of the vehicle 10 by querying the road terrain memory 34. In a step 120, the ECU 14 identifies the current road condition at the current geographic location of the vehicle 10 by querying the current condition identifier 36. In a step 122, at least one of the respective actions taken by the driver (e.g., at least one of a throttle position set by the driver, a gear position set by the driver, and a brake demanded by the driver) following the cruise control override and, optionally, other drivers (e.g., previous drivers) following cruise control overrides at the current geographic location are identified by the ECU 14. In a step 124, the presence of the forward vehicle 24 is determined. If the forward vehicle 24 is present, the distance to the forward vehicle 24 is also determined in the step 124.

In a step 130, the ECU 14 creates a current driver behavior profile identifying the cruise control system 12 override based on the current geographic location of the vehicle 10 where the cruise control override occurred, the road terrain of the current geographic location of the vehicle 10, the current road condition, the respective actions taken by the driver and, optionally, the other drivers (e.g., at least one of the throttle position set by the driver and/or the other drivers, the gear position set by the driver and/or the other drivers, and the brake demanded by the driver and/or the other drivers) following the cruise control override, the presence of the forward vehicle 24, and if the forward vehicle 24 is present, distance to the forward vehicle 24. The current driver behavior profile is transmitted from the ECU 14 to the driver memory 40, where it is stored, in a step 132.

In a step 134, additional previous vehicle locations having similar road terrain are identified. Similar road terrain, for example, is a road grade and/or road curve within a predetermined range (e.g., within 2%) of the road grade and/or road curve at the current geographic location.

In a step 136, the ECU 14 queries the driver memory 40 to determine a total number of times the driver and/or the other drivers (e.g., previous drivers) have overrode the cruise control system 12 at the current geographic location and/or additional previous vehicle locations that have similar road terrain.

In a step 140, a determination is made whether the number of cruise control overrides by the driver and/or the other drivers at the current location and/or additional previous vehicle locations that have similar road terrain and, optionally, current road conditions is at least a predetermined number (e.g., three (3)). In one embodiment, the predetermined number is chosen so that the number of cruise control system 12 overrides is statistically relevant before a profile of the driver's behavior at a particular location is created. For example, if a driver overrides the cruise control system 12 only once within a time period (e.g., one-month) or only once in ten times of driving at the location because of an unusual event (e.g., a deer standing on the road), that single override of the cruise control system 12 is not considered statistically relevant for purposes of creating a profile of the driver behavior at that location. If, on the other hand, the driver consistently (e.g., at least the predetermined number of tunes) overrides the cruise control system 12 at a particular location, the driver's behavior is considered to be statistically relevant so that it becomes desirable to create a profile of the driver's behavior at that location. If the number in the step 140 is less than the predetermined number, control returns to the step 110. Otherwise, if the number in the step 140 is at least the predetermined number, control passes to a step 142.

In the step 142, the ECU 14 creates a profile of the driver behavior associated with the current geographic location and/or the additional previous vehicle locations that have similar road terrain and/or road conditions based on the respective actions by the driver and, optionally, other drivers (e.g., previous drivers) at the current geographic location and the additional previous vehicle locations that have similar road terrain. It is also contemplated that the ECU 14 creates a profile of the driver behavior associated with the current geographic location and/or the additional previous vehicle locations that have similar road terrain and/or road conditions based on the respective actions by the driver and, optionally, other drivers (e.g., previous drivers) at any location having the road terrain. In one embodiment, the ECU 14 creates the profile of the driver behavior by applying the actions taken by the driver at the current geographic location. In another embodiment, the ECU 14 creates the profile of the driver behavior by applying the actions and/or averages or combinations of actions taken by the driver and/or other drivers at one of the additional previous vehicle locations. An average of an action is determined as an average change of, for example, the throttle at the current geographic location and the additional previous vehicle locations that have similar road terrain. For example, if the driver increases the throttle 4% at the current geographic location and 6%, 3%, and 4% at the additional previous vehicle locations, the average action (e.g., throttle increase) by the driver at the current geographic location and the additional previous vehicle locations is 4.25% (i.e., (4%+6%+3%+4%)/4).

In a step 144, a determination is made whether the profile (e.g., the behavior profile) created in the step 142 is acceptable (e.g., safe) for the road terrain at the current geographic location and the additional previous vehicle locations. In one embodiment, the determination in the step 144 is also made based on the current road condition. If it is determined in the step 144 that the behavior profile created in the step 142 is not acceptable, control returns to the step 110. Otherwise, if it is determined in the step 144 that the behavior profile created in the step 142 is acceptable, the behavior profile created in the step 142 is set as a default behavior profile for the current geographic location and the additional previous vehicle locations in a step 146. Optionally, in the step 146, the behavior profile created in the step 142 is set as a default behavior profile for any location having similar road terrain and/or current road condition and stored in the driver memory 40. Therefore, after the step 146, the behavior profile created in the step 142 will be used in the future for the current geographic location, the additional previous vehicle locations, and optionally at any location having similar road terrain and/or current road condition. Control then returns to the step 110.

In one embodiment, different behavior profiles are stored in the driver memory 40 for respective drivers. Each of the driver's behavior profiles identifies acceptable actions at geographic locations having similar road terrain and conditions.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

I claim:

1. A method for controlling a cruise control system on a vehicle, the method comprising:
   identifying a vehicle location;
   identifying a number of respective cruise control overrides by a driver at the vehicle location;
   if the number of cruise control overrides by the driver is at least a threshold number of overrides:
      identifying respective actions by the driver after the cruise control overrides; and
      controlling the cruise control system by creating a profile of the driver behavior associated with the vehicle location based on the respective actions by the driver within a range around the vehicle location after the driver overrode the cruise control;
   identifying a road terrain associated with the vehicle location;
   determining if a number of cruise control overrides by other drivers occur at the vehicle location is at least a predetermined number;
   if the number of overrides by other drivers occur at the vehicle location is at least the predetermined number, determining the override by the driver at the vehicle location is statistically relevant; and
   if the override by the driver at the vehicle location is statistically relevant, updating a central cruise control database to set a default profile for behaviors of all drivers at the vehicle location.

2. The method for controlling a cruise control system on a vehicle as set forth in claim 1, further including:
   identifying an additional previous vehicle location having the road terrain;
   identifying respective actions by the driver while driving on the road terrain;
   identifying a number of respective cruise control overrides by a driver at the vehicle location and the additional previous vehicle location; and creating a profile of the driver behavior associated with the vehicle location and the additional previous vehicle location based on the respective actions by the driver at the vehicle location and the additional previous vehicle location after the driver overrides the cruise control.

3. The method for controlling a cruise control system on a vehicle as set forth in claim 1, further including:
   determining whether to set the profile of the driver behavior associated with the vehicle location as a default cruise control profile for the driver behavior at the vehicle location; and
   based on the determination, setting the profile of the driver behavior associated with the vehicle location as the default cruise control profile for the driver behavior at the vehicle location.

4. The method for controlling a cruise control system on a vehicle as set forth in claim 3, wherein:
   the determining step includes:
      determining if the profile of the driver behavior associated with the vehicle location is acceptable for a road terrain associated with the vehicle location; and
   the setting step includes:
      if the profile of the driver behavior associated with the vehicle location is acceptable for the road terrain, setting the profile of the driver behavior associated with the vehicle location as a default profile for the driver behavior at the vehicle location.

5. The method for controlling a cruise control system on a vehicle as set forth in claim 1, further including:
   wherein the step of identifying a road terrain includes:
      identifying a road grade greater than a 1% as a non-flat road.

6. The method for controlling a cruise control system on a vehicle as set forth in claim 1, further including:
   if the override by the driver at the vehicle location is statistically relevant, updating a central cruise control database to set a default profile for behaviors of all drivers at another location having the road terrain.

7. The method for controlling a cruise control system on a vehicle as set forth in claim 1, wherein the step of identifying respective actions by the driver includes:
   identifying at least one of a throttle position, a gear position, a brake demand, and a distance to a forward vehicle.

8. The method for controlling a cruise control system on a vehicle as set forth in claim 7, wherein the step of identifying respective actions by the driver includes at least one of:
   identifying a change in the throttle position;
   identifying a change in the a gear position;
   identifying a change in the brake demand; and
   identifying a change in the distance to the forward vehicle.

9. The method for controlling a cruise control system on a vehicle as set forth in claim 1,
   further including:
      identifying a current driving condition associated with the vehicle location;
   wherein the controlling step includes:
      creating the profile of the driver behavior associated with the vehicle location based on the respective actions by the driver at the vehicle location after the driver overrode the cruise control;
   wherein the determining step includes:
      determining if the profile of the driver behavior associated with the vehicle location is acceptable for the road terrain associated with the vehicle location; and
   wherein the setting step includes:
      based on the determination, setting the profile of the driver behavior associated with the vehicle location as the default cruise control profile for the driver behavior at the vehicle location.

10. The method for controlling a cruise control system on a vehicle as set forth in claim 9, wherein the step of identifying the current driving condition includes:
    identifying one of dry, wet, and icy; and
    identifying one of clear and snow covered as the current driving condition on the road.

11. A method for controlling a cruise control system on a vehicle, the method comprising:
    identifying a vehicle location;
    identifying a road terrain associated with the vehicle location;
    identifying an additional previous vehicle location having the road terrain;
    identifying a number of respective cruise control overrides by a driver at the vehicle location and the additional previous vehicle location;
    if the number of cruise control overrides by the driver is at least a threshold number of overrides:
       identifying respective actions by the driver while driving on the road terrain after the cruise control overrides;
       creating a profile of a behavior of the driver associated with the road terrain based on the respective actions by the driver at the vehicle location and the additional previous vehicle location after the driver overrode the cruise control;
    determining whether to set the profile of the behavior of the driver associated with the road terrain as a default cruise control profile for the behavior of the driver at another location having the road terrain; and
    based on the determination, controlling the cruise control system by setting the profile of the behavior of the driver associated with the road terrain as the default cruise control profile for the behavior of the driver at the other location having the road terrain;
    determining if a number of cruise control overrides by other drivers occur at the vehicle location is at least a predetermined number;
    if the number of overrides by other drivers occur at the vehicle location is at least the predetermined number, determining the override by the driver at the vehicle location is statistically relevant; and
    if the override by the driver at the vehicle location is statistically relevant, updating a central cruise control database to set a default profile for behaviors of all drivers at the vehicle location.

12. The method for controlling a cruise control system on a vehicle as set forth in claim 11, wherein:
    the determining step includes:
       determining if the profile of the behavior of the driver associated with the vehicle location and the additional location is acceptable for the road terrain associated with the vehicle location and the additional previous location; and
    the setting step includes:
       if the profile of the behavior of the driver associated with the vehicle location and the additional previous location is acceptable for the road terrain, setting the profile of the behavior of the driver associated with the vehicle location and the additional previous location as a default profile for the behavior of the driver at another location having the road terrain.

13. A controller for controlling a cruise control system on a vehicle, the controller being adapted to:
- identify a vehicle location;
- identify a number of respective cruise control overrides by a driver at the vehicle location;
- if the number of cruise control overrides by the driver is at least a threshold number of overrides, the controller is adapted to:
  - identify respective actions by the driver after the cruise control overrides;
  - control the cruise control system by creating a profile of the behavior of the driver associated with the vehicle location based on the respective actions by the driver at the vehicle location after the driver overrode the cruise control;
- identify a road terrain associated with the vehicle location;
- determine if a number of cruise control overrides by other drivers occur at the vehicle location is at least a predetermined number;
- if the number of overrides by other drivers occur at the vehicle location is at least the predetermined number, determine the override by the driver at the vehicle location is statistically relevant; and
- if the override by the driver at the vehicle location is statistically relevant, update a central cruise control database to set a default profile for behaviors of all drivers at the vehicle location.

14. The controller as set forth in claim 13, wherein the controller is adapted to:
- if the override by the driver at the vehicle location is statistically relevant, update a central cruise control database to set a default profile for behaviors of all drivers at the vehicle location.

15. The controller as set forth in claim 13, further including:
- determine whether to set the profile of the behavior of the driver associated with the vehicle location as a default cruise control profile for the behavior of the driver at the vehicle location; and
- based on the determination, set the profile of the behavior of the driver associated with the vehicle location as the default cruise control profile for the behavior of the driver at the vehicle location.

16. The controller as set forth in claim 13, wherein:
- if the number of cruise control overrides by the driver is at least the threshold number of overrides, the controller is adapted to:
  - identify respective actions by the driver while driving on the road terrain after the cruise control overrides;
- the controller is adapted to determine if the profile of the behavior of the driver associated with the vehicle location is acceptable for the road terrain associated with the vehicle location; and
- if the profile of the behavior of the driver associated with the vehicle location is acceptable for the road terrain, the controller is adapted to set the profile of the behavior of the driver associated with the vehicle location as a default profile for the behavior of the driver at the vehicle location.

17. The controller as set forth in claim 13, wherein the controller is adapted to:
- identify a current driving condition associated with the vehicle location;
- create the profile of the driver behavior associated with the vehicle location and the additional previous vehicle location with the same driving condition based on the respective actions by the driver at the vehicle location and the additional previous vehicle location after the driver overrode the cruise control;
- determine if the profile of the driver behavior associated with the vehicle location and the additional previous vehicle location is acceptable for the road terrain associated with the vehicle location and the additional previous vehicle location having the same driving condition; and
- based on the determination, set the profile of the driver behavior associated with at least one of the vehicle location and the additional previous vehicle location as the default cruise control profile for the driver behavior at the at least one of the vehicle location and the additional previous vehicle location with the driving condition.

18. The controller as set forth in claim 17, wherein the controller is adapted to identify the current driving condition as:
- one of dry, wet, and icy; and
- one of clear and snow covered.

19. The controller as set forth in claim 13, wherein:
- the respective actions of the driver identified by the controller include at least one of a throttle position, a gear position, a brake demand, and a distance to a forward vehicle.

20. The controller as set forth in claim 19, wherein: the controller is adapted to identify the respective actions by the driver as at least one of:
- a change in the throttle position;
- a change in the a gear position;
- a change in the brake demand; and
- a change in the distance to the forward vehicle.

21. A system for controlling a cruise control system on a vehicle, the system comprising:
- a controller adapted to:
  - identify a vehicle location;
  - identify a number of respective cruise control overrides by a driver at the vehicle location and an additional previous vehicle location;
  - if the number of cruise control overrides by the driver is at least a threshold number of overrides:
    - identify respective actions by the driver after the cruise control overrides; and
    - create a profile of the driver behavior associated with the vehicle location and the additional previous vehicle location based on the respective actions by the driver at the vehicle location and the additional previous vehicle location after the driver overrode the cruise control;
  - identify a road terrain associated with the vehicle location;
  - determine if a number of cruise control overrides by other drivers occur at the vehicle location is at least a predetermined number;
  - if the number of overrides by other drivers occur at the vehicle location is at least the predetermined number, determine the override by the driver at the vehicle location is statistically relevant; and
  - if the override by the driver at the vehicle location is statistically relevant, update a central cruise control database to set a default profile for behaviors of all drivers at the vehicle location;
- means for determining whether to set the profile of the driver behavior associated with the vehicle location and the additional previous vehicle location as a default cruise control profile for the driver behavior at the vehicle location and the additional previous vehicle location; and means for controlling the cruise control system by setting the profile of the driver behavior associated with at least one of the vehicle location and the additional previous vehicle location, based on the determination, as the default cruise control profile for the driver behavior at the vehicle location and the additional previous vehicle location.

22. The system for controlling a cruise control system on a vehicle as set forth in claim 21, wherein the controller is further adapted to:

identify a road terrain associated with the vehicle location;

identify if the additional previous vehicle location has the road terrain; and if the number of cruise control overrides by the driver is at least a threshold number of overrides:

identify respective actions by the driver while driving on the road terrain after the cruise control overrides.

* * * * *